(12) United States Patent
Lin

(10) Patent No.: US 12,532,353 B2
(45) Date of Patent: Jan. 20, 2026

(54) APPARATUS AND METHOD OF COMMUNICATION OF SAME

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 323 days.

(21) Appl. No.: 17/879,602

(22) Filed: Aug. 2, 2022

(65) Prior Publication Data

US 2022/0386370 A1 Dec. 1, 2022

Related U.S. Application Data

(63) Continuation of application No. PCT/IB2020/000489, filed on Feb. 24, 2020.

(51) Int. Cl.
*H04W 74/0808* (2024.01)
*H04W 72/23* (2023.01)

(52) U.S. Cl.
CPC ....... *H04W 74/0808* (2013.01); *H04W 72/23* (2023.01)

(58) Field of Classification Search
CPC ................................................ H04W 74/0808
See application file for complete search history.

(56) References Cited

U.S. PATENT DOCUMENTS

| 12,302,410 | B2 * | 5/2025 | Wang | H04W 74/0866 |
| 2019/0037584 | A1 * | 1/2019 | Park | H04W 72/1268 |
| 2020/0280971 | A1 * | 9/2020 | Moon | H04L 5/0053 |
| 2021/0235419 | A1 * | 7/2021 | Si | H04W 16/14 |
| 2022/0061094 | A1 * | 2/2022 | Jung | H04W 74/0816 |

FOREIGN PATENT DOCUMENTS

WO 2021171053 A1 9/2021

OTHER PUBLICATIONS

International Search Report (ISR) dated Dec. 4, 2020 for Application No. PCT/IB2020/000489.
Written Opinion (WOSA) dated Dec. 4, 2020 for Application No. PCT/IB2020/000489.
Mediatek Inc: "DL Signals and Channels for NR-U Operation", 3GPP Draft R1-1912086, Nov. 9, 2019 (Nov. 9, 2019), all pages.
Huawei et al: "Corrections on PDCCH/GC-PDCCH monitoring procedure in TS38.213", 3GPP Draft R1-2000195, Feb. 15, 2020 (Feb. 15, 2020), all pages.

(Continued)

*Primary Examiner* — Jason E Mattis
(74) *Attorney, Agent, or Firm* — Ladas & Parry, LLP

(57) ABSTRACT

An apparatus and a method of communication of the same are provided. A method of communication of a user equipment (UE) includes receiving, by a UE, information. The information is used to determine a channel state of a first bandwidth of a cell. This allows the UE to determine the channel state of the first bandwidth of the cell and further determine resource block set (RB set) availability of an active bandwidth part (BWP) based on the channel state of the first bandwidth.

15 Claims, 4 Drawing Sheets

(56) References Cited

OTHER PUBLICATIONS

Huawei et al: "Corrections on the wideband operation procedures", 3GPP Draft R1-2000201, Feb. 15, 2020 (Feb. 15, 2020), all pages.
Mediatek Inc: "Wideband operation for NR-U", 3GPP Draft R1-1911056, Oct. 8, 2019 (Oct. 8, 2019), all pages.
Ericsson: "Wideband operation for NR-U", 3GPP Draft R1-1912713, Nov. 9, 2019 (Nov. 9, 2019), all pages.
Vivo: "Potential solutions and techniques for NR unlicensed spectrum", 3GPP Draft R1-1801557, Feb. 15, 2018 (Feb. 15, 2018), all pages.
The first Office Action of corresponding European patent application No. 20753407.4 , dated Feb. 22, 2024.

* cited by examiner

APPARATUS AND METHOD OF COMMUNICATION OF SAME

CROSS-REFERENCE TO RELATED APPLICATIONS

This application is a continuation of International Application No. PCT/IB2020/000489, filed on Feb. 24, 2020, the disclosure of which is hereby incorporated by reference in its entirety.

TECHNICAL FIELD

The present disclosure relates to the field of communication systems, and more particularly, to an apparatus (such as a user equipment (UE) and/or a base station (BS)) and a method of communication of the same, which can provide a good communication performance and high reliability.

BACKGROUND

In an unlicensed band, an unlicensed spectrum is a shared spectrum. Communication equipments in different communication systems can use the unlicensed spectrum as long as the unlicensed spectrum meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

In new radio-based access to unlicensed spectrum (NRU), a wideband operation can be configured and a configured active bandwidth part (BWP) can include resource block sets (RB sets). Listen before talk (LBT) availability of the RB sets in the configured active BWP should be indicated to a user equipment (UE), such that the UE will rely the indication to perform signal receptions. However, how to indicate the LBT availability of the RB sets in the configured active BWP to the UE is still an open issue.

In addition, in an NRU wideband operation, a BS (such as gNB) and a UE can operate in a wider band including RB sets. NR release 15 has defined a BWP concept, thus in a context of the NRU wideband operation, the UE can be configured with an active BWP including multiple RB sets. However, by regulation, priori to each transmission in the spectrum, a sender needs to perform the LBT procedure. This implies that for transmissions of multiple RB sets, multi-RB set-based LBT has to be performed. Because an outcome of the multi-RB-set based LBT cannot be ensured, the UE or the BS cannot predict the outcome of the LBT procedure.

Therefore, there is a need for an apparatus (such as a UE and/or a BS) and a method of communication of the same, which can solve issues in the prior art, allow the apparatus to determine a channel state of a first bandwidth of a cell, and may further allow the apparatus to determine RB set availability of an active BWP based on the channel state of the first bandwidth.

SUMMARY

An object of the present disclosure is to propose an apparatus (such as a UE and/or a BS) and a method of communication of the same, which can solve issues in the prior art, allow the apparatus to determine a channel state of a first bandwidth of a cell, and may further allow the apparatus to determine RB set availability of an active BWP based on the channel state of the first bandwidth.

In a first aspect of the present disclosure, a method of communication of a user equipment (UE) includes receiving, by a UE, information, wherein the information is used to determine a channel state of a first bandwidth of a cell.

In a second aspect of the present disclosure, a UE includes a memory, a transceiver, and a processor coupled to the memory and the transceiver. The processor is configured to control the transceiver to receive information, wherein the information is used to determine a channel state of a first bandwidth of a cell.

In a third aspect of the present disclosure, a method of communication of a base station (BS) includes transmitting, by a BS, information, wherein the information is used to determine a channel state of a first bandwidth of a cell.

In a fourth aspect of the present disclosure, a BS includes a memory, a transceiver, and a processor coupled to the memory and the transceiver. The processor is configured to control the transceiver to transmit information, wherein the information is used to determine a channel state of a first bandwidth of a cell.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
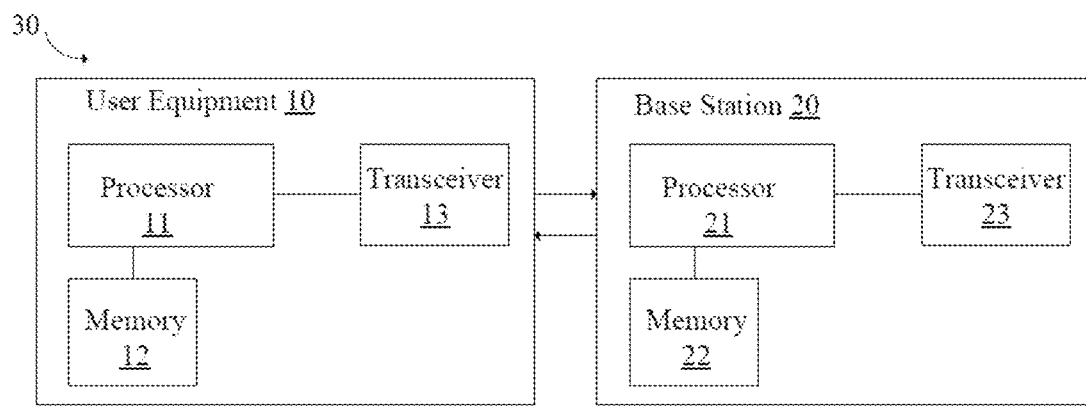
FIG. 1 is a block diagram of a user equipment (UE) and a base station (BS) (e.g., gNB) of communication in a communication network system according to an embodiment of the present disclosure.

FIG. 1 illustrates that, in some embodiments, a user equipment (UE) 10 and a base station (BS) (e.g., gNB) 20 of communication in a communication network system 30 according to an embodiment of the present disclosure are provided. The communication network system 30 includes one or more UEs 10 of a cell and the BS 20. The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to control the transceiver 13 to receive information, wherein the information is used to determine a channel state of a first bandwidth (to be described in detail in FIG. 4 to FIG. 8) of a cell. In some embodiments, the processor 21 is configured to control the transceiver 23 to transmit the information, wherein the information is used to determine the channel state of the first bandwidth of the cell. For example, the cell is the same as a cell where the UE 10 is located. In some embodiments, the cell is a serving cell. This allows the UE 10 and/or the BS 20 to determine the channel state of the first bandwidth of the cell. Further, this allows the UE 10 and/or the BS 20 to determine resource block set (RB set) availability of an active bandwidth part (BWP) based on the channel state of the first bandwidth.

Figure 2:
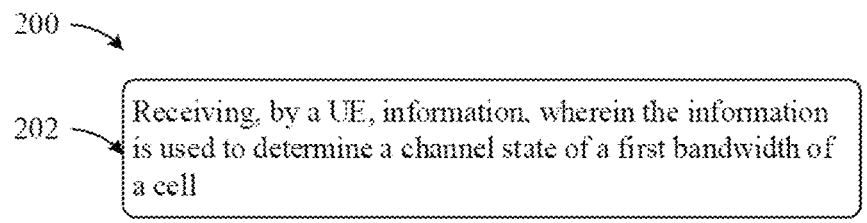
FIG. 2 is a flowchart illustrating a method of communication of a UE according to an embodiment of the present disclosure.

FIG. 2 illustrates a method 200 of communication of a UE according to an embodiment of the present disclosure. In some embodiments, the method 200 includes: a block 202, receiving, by a UE, information, wherein the information is used to determine a channel state of a first bandwidth of a cell. This allows the UE to determine the channel state of the first bandwidth of the cell. Further, this allows the UE to determine resource block set (RB set) availability of an active bandwidth part (BWP) based on the channel state of the first bandwidth.

Figure 3:
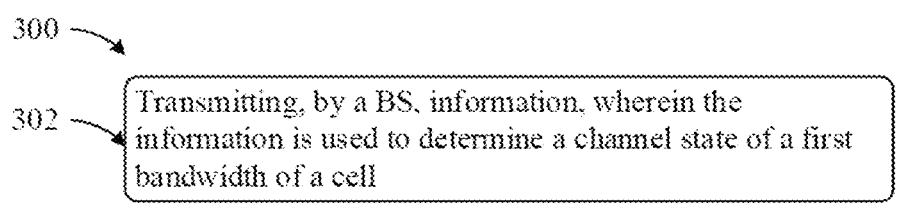
FIG. 3 is a flowchart illustrating a method of communication of a BS according to an embodiment of the present disclosure.

FIG. 3 illustrates a method 300 of communication of a BS according to an embodiment of the present disclosure. In some embodiments, the method 300 includes: a block 302, transmitting, by a BS, information, wherein the information is used to determine a channel state of a first bandwidth of a cell. This allows the BS to determine the channel state of the first bandwidth of the cell. Further, this allows the BS to determine resource block set (RB set) availability of an active bandwidth part (BWP) based on the channel state of the first bandwidth.

In some embodiments, the first bandwidth comprises a cell usable bandwidth (to be described in detail in FIG. 4 to FIG. 8). In some embodiments, the channel state of the first bandwidth comprises a listen before talk (LBT) state. In some embodiments, the information is in a downlink control information (DCI). In some embodiments, the DCI is received in a physical downlink control channel (PDCCH) by the UE. In some embodiments, the DCI is transmitted in the PDCCH by the BS. The PDCCH is such as a group common PDCCH. In some embodiments, the parameter indicates one guard band and the guard band size is zero, or the parameter indicates more than one guard bands, all the guard band sizes are zero.

In some embodiments, the DCI comprises a DCI format 2_0. In some embodiments, the UE 10 is further configured with a parameter. In some embodiments, the BS 20 is further to transmit, to the UE 10, the parameter. In some embodiments, the parameter is pre-defined, if the parameter is not configured. In some embodiments, the parameter is in a radio resource control (RRC). In some embodiments, the parameter is in intraCellGuardBandDL-r16 for downlink or intraCellGuardBandUL-r16 for uplink.

Figure 4:
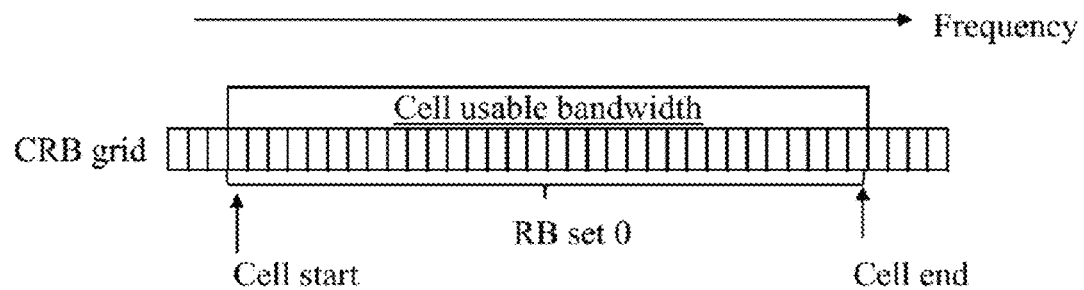
FIG. 4 is a schematic diagram illustrating a first bandwidth of a cell according to an embodiment of the present disclosure.

In some embodiments, the parameter indicates one guard band with size being zero (to be described in detail in FIG. 4). In some embodiment, the guard band size is an intra-cell guard band size. In some embodiments, the first bandwidth comprises one resource block set (RB set) (to be described in detail in FIG. 4), and the information has one bit to indicate a state of the RB set in the first bandwidth. In some embodiments, the RB set has index 0. In some embodiments, a size of the RB set in the first bandwidth is equal to a size of the first bandwidth. In some embodiments, a bit value "1" indicates that the RB set in the first bandwidth is available for reception, and a bit value "0" indicates that the RB set in the first bandwidth is unavailable for reception.

Figure 5:
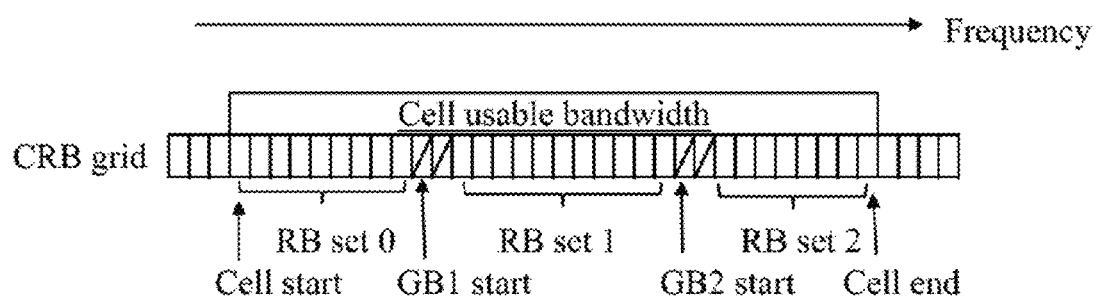
FIG. 5 is a schematic diagram illustrating a first bandwidth of a cell according to another embodiment of the present disclosure.
Figure 7:
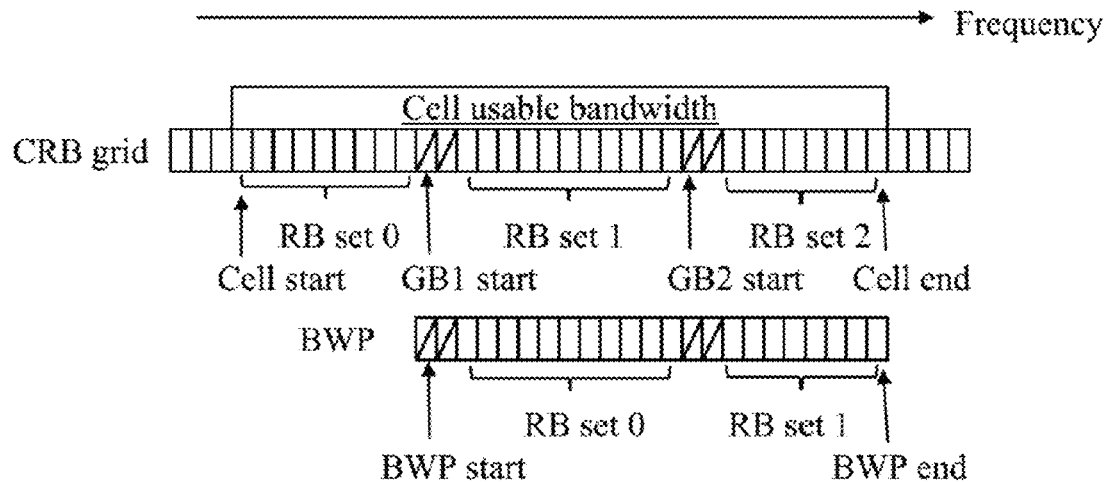
FIG. 7 is a schematic diagram illustrating a first bandwidth of a cell and a second bandwidth of the cell according to another embodiment of the present disclosure.
Figure 8:
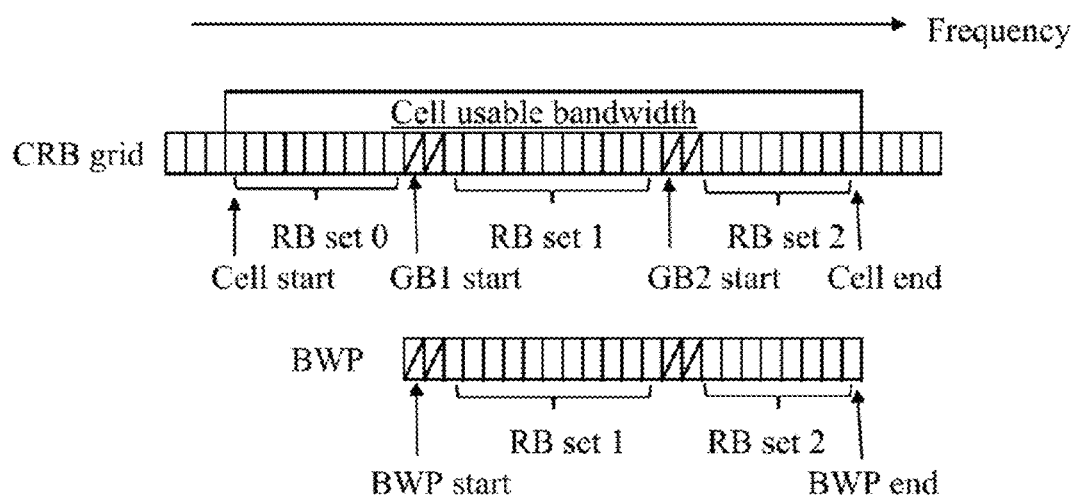
FIG. 8 is a schematic diagram illustrating a first bandwidth of a cell and a second bandwidth of the cell according to still another embodiment of the present disclosure.

In some embodiments, the parameter indicates one or more guard bands in the first bandwidth (to be described in detail in FIG. 5, FIG. 7, and FIG. 8). In some embodiments, the first bandwidth comprises two or more RB sets, and the information has one or more bits to indicate a state of the RB sets in the first bandwidth. In some embodiments, when the information has one bit to indicate the state of the RB sets in the first bandwidth, a bit value "1" indicates that the RB sets in the first bandwidth are available for reception, and a bit value "0" indicates that the RB sets in the first bandwidth are unavailable for reception.

In some embodiments, the bits to indicate the state of the RB sets in the first bandwidth have an ordering from a least significant bit (LSB) to a most significant bit (MSB).

In some embodiments, the RB sets in the first bandwidth have indexes, the indexes and locations of the RB sets in the first bandwidth are obtained based on the parameter and the first bandwidth. In some embodiments, the indexes of the RB sets in the first bandwidth are from 0 in an ascending order in a frequency domain. In some embodiments, the LSB to the MSB of the bits to indicate the state of the RB sets in the first bandwidth one-to-one correspond to index 0 to a last index in an ascending order of the RB sets in the first bandwidth. That is, the LSB of the bits to indicate the state of the RB sets in the first bandwidth corresponds to the index 0 of the RB sets in the first bandwidth, and so on to the MSB of the bits to indicate the state of the RB sets in the first bandwidth corresponds to the last index of the RB sets in the first bandwidth. In some embodiments, the MSB to the LSB of the bits to indicate the state of the RB sets in the first bandwidth one-to-one correspond to the index 0 to the last index in the ascending order of the RB sets in the first bandwidth. That is, the MSB of the bits to indicate the state of the RB sets in the first bandwidth corresponds to the index 0 of the RB sets in the first bandwidth, and so on to the LSB of the bits to indicate the state of the RB sets in the first bandwidth corresponds to the last index of the RB sets in the first bandwidth. In some embodiments, a size of each of the RB sets in the first bandwidth is less than a size of the first bandwidth. In some embodiments, a sum of a size of the RB sets in the first bandwidth and a size of the one or more guard bands in the first bandwidth is equal to the size of the first bandwidth. In some embodiments, each bit from the bits corresponds to a dedicated RB set index, a bit value "1" indicates that the RB set with a corresponding RB set index is available for reception, and a bit value "0" indicates that the RB set with a corresponding RB set index is unavailable for reception.

In some embodiments, the first bandwidth is provided by an RRC configuration. In some embodiments, the channel state of the first bandwidth of the cell is used to determine a channel state of a second bandwidth of the cell (to be described in detail in FIG. 6 to FIG. 8).

In some embodiments, the second bandwidth comprises an active downlink bandwidth part or an active uplink bandwidth part. In some embodiments, the first bandwidth and the second bandwidth overlap in a frequency domain. In some embodiments, a size of the second bandwidth is less than or equal to a size of the first bandwidth. In some embodiments, the second bandwidth has one or more RB sets, the one or more RB sets in the first bandwidth and the one or more RB sets in the second bandwidth overlap in a frequency domain. In some embodiments, the one or more RB sets in the first bandwidth and the one or more RB sets in the second bandwidth overlapping each other in the frequency domain have the same channel state.

In some embodiments, the RB sets in the second bandwidth have indexes (to be described in detail in FIG. 7 and FIG. 8). In some embodiments, the indexes of the RB sets in the second bandwidth are from 0 in an ascending order in the frequency domain. In some embodiments, the one or more RB sets in the first bandwidth and the one or more RB sets in the second bandwidth overlapping each other in the frequency domain have the same index number or different index numbers. In some embodiments, the RB set with index i in the second bandwidth is available for reception if the RB set with index j in the first bandwidth is available for reception. In some embodiments, the RB set with index i in the second bandwidth is unavailable for reception if the RB set with index j in the first bandwidth is unavailable for reception, where the RB set with index i in the second bandwidth is overlapped with the RB set with index j in the first bandwidth.

FIG. 4 illustrates a first bandwidth of a cell according to an embodiment of the present disclosure. In some embodiments, a BS (e.g. as a gNB) provides a UE with a parameter such as intraCellGuardBandDL-r16 for downlink, and provided intra-cell guard band information indicates one or more guard bands with zero guard band (GB) size, i.e. either directly indication of guard band size is 0, or derived from an ending position common resource block (CRB) index is smaller than a starting position CRB index, causes CRB index (ending)-CRB index (starting) to be a negative value. In this embodiment, it means that GB does not exist, so that a first bandwidth of a cell such as a cell usable bandwidth include only one RB set whose index is 0 as illustrated in FIG. 4. In some embodiments, the RB set has index 0. In some embodiments, a size of the RB set in the first bandwidth is equal to a size of the first bandwidth. In some embodiments, a bit value "1" indicates that the RB set in the first bandwidth is available for reception, and a bit value "0" indicates that the RB set in the first bandwidth is unavailable for reception.

FIG. 5 illustrates a first bandwidth of a cell according to another embodiment of the present disclosure. In some embodiments, for RB sets in the first bandwidth (such as a cell usable bandwidth), a UE can derive a number of RB sets, RB set index, and locations by a cell usable bandwidth location and intra-cell guard bands. One example is illustrated in FIG. 5, where the cell usable bandwidth is defined in a common RB (CRB) grid with a starting CRB index and a cell usable bandwidth size (in terms of RB). Then UE first determines the cell usable bandwidth location. After that, the UE obtains intra-cell guard band information which includes a number of guard bands, locations thereof, and a size of each guard band (GB). In an example, the intra-cell guard band information provides two guard bands (i.e. GB1 and GB2), a starting GB position and a guard band size (in terms of RB) are also given. The starting position of a GB can be given with CRB index (In the example, both GB1 and GB2 have the same GB size of 2 RBs). Then the cell usable bandwidth is divided into 3 RB sets with RB set index from 0 to 2. The RB set index is ordered in an ascending order in frequency domain, i.e. index 0 in lower frequency and index 2 in higher frequency. Note that to achieve the same or similar result, the intra-cell guard band information can includes a GB starting CRB index and an ending CRB index as well instead of a GB size. The intra-cell guard band information can be provided by the gNB to UE via RRC configuration with dedicated parameter of intraCellGuardBandDL-r16 for downlink and of intraCellGuardBandUL-r16 for uplink. Moreover, if these parameters are not provided by the gNB, UE can also derive the RB sets in the cell usable bandwidth by pre-defined intra-cell guard band information from specifications. In some embodiments, the first bandwidth comprises three RB sets (that is RB set 0, RB set 1, and RB set 2), and the information has one or more bits to indicate a state of the RB sets in the first bandwidth. In some embodiments, when the information has one bit to indicate the state of the RB sets in the first bandwidth, a bit value "1" indicates that the RB sets (that is RB set 0, RB set 1, and RB set 2) in the first bandwidth (that is cell usable bandwidth) are available for reception, and a bit value "0" indicates that the RB sets in the first bandwidth are unavailable for reception. In some embodiments, the bits to indicate the state of the RB sets in the first bandwidth have an ordering from a least significant bit (LSB) to a most significant bit (MSB).

Figure 6:
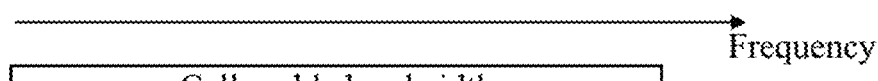
FIG. 6 is a schematic diagram illustrating a first bandwidth of a cell and a second bandwidth of the cell according to an embodiment of the present disclosure.

FIG. 6 illustrates a first bandwidth of a cell and a second bandwidth of the cell according to an embodiment of the present disclosure. In some embodiments, in a wideband transmission in an unlicensed spectrum operation, a UE can be configured with an active downlink or uplink bandwidth part (DL or UL BWP) that includes one or more resource block sets (RB sets). During data reception, it is important for the UE to know if configured RB sets in the active DL BWP is available for reception. The availability means that the BS (such as gNB) has performed an LBT for each RB set, and there is no other transmissions ongoing so that the gNB will gain a channel for transmission, i.e. LBT success; otherwise the RB set is not available for the gNB to transmit any signal, i.e. LBT failure. If it is known to the UE that the RB set is not available, the UE will not perform signal reception in the RB set. In some embodiments, RB sets are used in two different contexts. FIG. 6, gives a relation between the cell usable bandwidth and the active DL BWP. It can be that, one or more RB sets are in a first bandwidth (such as a cell usable bandwidth) of a given cell. In the other context, one or more RB sets are in a second bandwidth (such as an active DL BWP) of the given cell. Note that the cell usable bandwidth including an active DL BWP and an active DL BWP is a part of the cell usable bandwidth.

FIG. 7 illustrates a first bandwidth of a cell and a second bandwidth of the cell according to another embodiment of the present disclosure. In some embodiments, for RB sets in an active DL BWP or an active UL BWP, a UE first determines a location of the active DL or UL BWP (that is a second bandwidth). To do this, the UE will be provided by a gNB with BWP configuration, which includes a BWP starting position (in CRB index) and a BWP size (in terms of RB). Then, the UE can derive BWP starting and end positions as illustrated in FIG. 7. Once the location of the active DL or UL BWP is determined, intersection between the active BWP and a first bandwidth (such as a cell usable bandwidth) can give the RB sets in the active BWP. FIG. 7 illustrates that, in some embodiments, the active BWP overlaps with RB set 1 and RB set 2 of the cell usable bandwidth. Thus, the UE determines there are two RB sets in this active BWP. The RB set index is ordered from 0 to 1 in the active BWP in an ascending order in the frequency domain. The advantage of indexing the RB sets in active BWP from 0 is to ease the frequency domain resource allocation (FDRA) since the reference starting index of the FDRA is usually from 0. In some embodiments, the indexes and locations of the RB sets in the first bandwidth are obtained based on the parameter and the first bandwidth. In some embodiments, a size of each of the RB sets (RB set 1, RB set 2, or RB set 3) in the first bandwidth is less than a size of the first bandwidth. In some embodiments, a sum of a size of the RB sets (RB set 1, RB set 2, and RB set 3) in the first bandwidth and a size of the one or more guard bands (GB 1 and GB 2) in the first bandwidth is equal to the size of the first bandwidth. In some embodiments, each bit from the bits corresponds to a dedicated RB set index, a bit value "1" indicates that the RB set with a corresponding RB set index is available for reception, and a bit value "0" indicates that the RB set with a corresponding RB set index is unavailable for reception.

FIG. 8 illustrates a first bandwidth of a cell and a second bandwidth of the cell according to still another embodiment of the present disclosure. In some embodiments, alternatively, an RB set index in an active BWP can also follow the same index of RB sets in a cell usable bandwidth as illustrated in FIG. 8. The advantage is that it eases for a UE to determine RB set availability as will be described in following embodiments.

To determine availability of RB sets in the active BWP (Downlink or Uplink), the UE will be configured to receive DCI format 2_0. In DCI format 2_0, there will be an indication field that contains X bits. These X bits are used to indicate the availability of the RB sets of the cell usable bandwidth of the cell. It is assumed that, there are Y RB sets in the cell usable bandwidth of the cell. If FIG. 4 is used as an example, Y=1 and if FIG. 7 and FIG. 8 are used as examples, Y=3.

In some embodiments, X can be 1, and if the bit value is "1", it means that Y RB sets are available; while if the bit is "0", it means that Y RB sets are unavailable. For FIG. 4, if the bit value is "1", the RB set 0 is available; otherwise it is not available. If we take FIG. 7 as an example, if the bit value is "1", the RB set 0, 1, and 2 are all available; otherwise the RB set 0, 1, and 2 are all unavailable. Then, the UE will determine the availability of the RB sets in the active BWP via the association between RB set index in the cell usable bandwidth and the RB set index in the active BWP. Since the RB set 1 in the cell usable bandwidth is overlapped with the RB set 0 in the active BWP, these two RB set indices are associated, i.e. they have the same RB set availability. That is if the RB set 1 in the cell usable bandwidth is available, the RB set 0 in the active BWP is also available. If the RB set 1 in the cell usable bandwidth is unavailable, the RB set 0 in the active BWP is also unavailable. However, in FIG. 8, since the RB set index is not changed from the cell usable bandwidth to the active BWP, the availability of the RB set index in the active BWP can be derived directly from the same RB set index in the cell usable bandwidth.

In some embodiments, X=Y, and each bit of X bits corresponds to a RB set index in the cell usable bandwidth, e.g. the least significant bit (LSB) corresponds to the RB set index 0, the next LSB corresponds to the RB set index 1 and so on. If the bit value is "1", it means the corresponding RB set is available; if the bit value is "0", it means the corresponding RB set is unavailable. For example, if the X bits (assume X=3 as shown in FIG. 7) indicate "010", it means, for the RB sets in the cell usable bandwidth, the RB set 0 is unavailable, the RB set 1 is available and the RB set 2 is unavailable. In the next step, UE will determine the availability of the RB sets in the active BWP via the association between the RB set index in the cell usable bandwidth and the RB set index in the active BWP. In the example of FIG. 7, for RB sets in active BWP, the RB set 0 is associated with RB set 1 of the cell usable bandwidth, i.e. if the RB set 1 in the cell usable bandwidth is available, the RB set 0 in the active BWP is also available; if the RB set 1 in the cell usable bandwidth is unavailable, the RB set 0 in the active BWP is also unavailable. The RB set 1 of the active BWP is associated with the RB set 2 of the cell usable bandwidth. However, in FIG. 8, since the RB set index is not changed from the cell usable bandwidth to the active BWP, the availability of the RB set index in the active BWP can be derived directly from the same RB set index in the cell usable bandwidth, i.e. if the RB set 1 in the cell usable bandwidth is available, the RB set 1 in active BWP is also available. If the RB set 1 in the cell usable bandwidth is unavailable, the RB set 1 in the active BWP is also unavailable.

Commercial interests for some embodiments are as follows. 1. allowing the apparatus (the UE and/or the BS) to determine a channel state of a first bandwidth of a cell. 2. allowing the apparatus to determine RB set availability of an active BWP based on the channel state of the first bandwidth. 3. providing a good communication performance. 4. providing a high reliability. 5. some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 9:
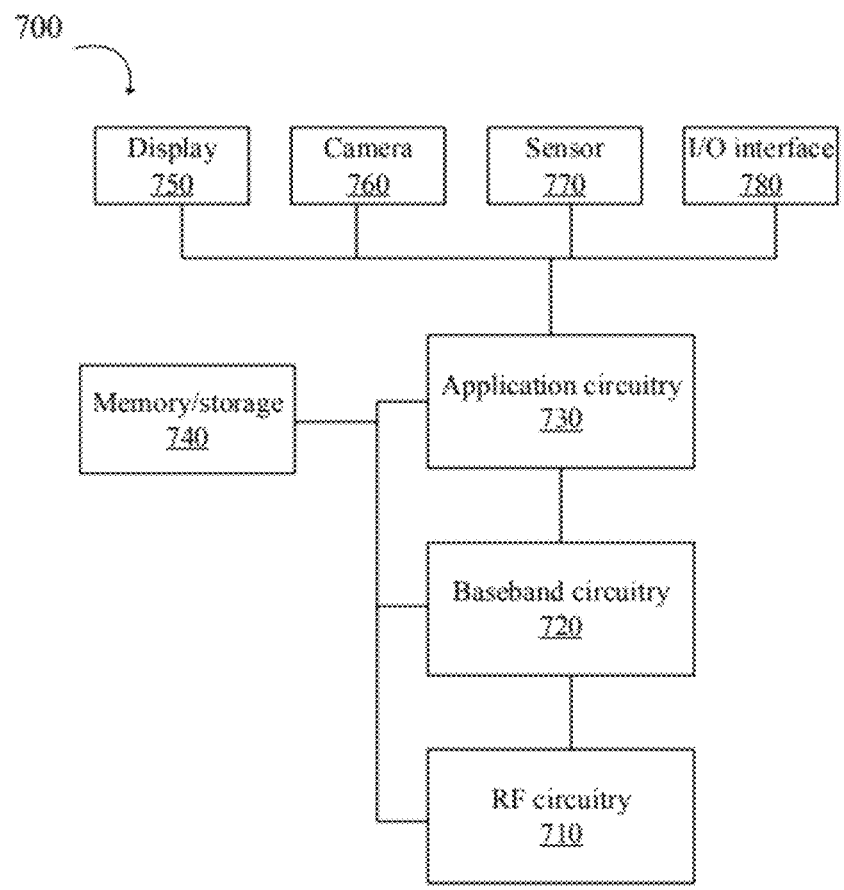
FIG. 9 is a block diagram of a system for wireless communication according to an embodiment of the present disclosure.

FIG. 9 is a block diagram of an example system 700 for wireless communication according to an embodiment of the present disclosure. Embodiments described herein may be implemented into the system using any suitably configured hardware and/or software. FIG. 9 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental states and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of communication of a user equipment (UE), comprising:
    receiving, by the UE, information, wherein the information is used to determine a channel state of a first bandwidth of a cell;
    wherein the UE is further configured with a parameter, and the parameter is pre-defined, if the parameter is not configured;
    wherein the parameter indicates one or more guard bands in the first bandwidth, and the first bandwidth comprises two or more resource block sets (RB sets), and the information has two or more bits to indicate a state of the RB sets in the first bandwidth;
    wherein the bits to indicate the state of the RB sets in the first bandwidth have an ordering from a least significant bit (LSB) to a most significant bit (MSB);
    wherein the RB sets in the first bandwidth have indexes, the indexes and locations of the RB sets in the first bandwidth are obtained based on the parameter and the first bandwidth;
    wherein the indexes of the RB sets in the first bandwidth are from 0 in an ascending order in a frequency domain;
    wherein the LSB to the MSB of the bits to indicate the state of the RB sets in the first bandwidth one-to-one correspond to index 0 to a last index in the ascending order of the RB sets in the first bandwidth, or the MSB to the LSB of the bits to indicate the state of the RB sets in the first bandwidth one-to-one correspond to the index 0 to the last index in the ascending order of the RB sets in the first bandwidth;
    wherein the channel state of the first bandwidth of the cell is used to determine a channel state of a second bandwidth of the cell, wherein the second bandwidth comprises an active downlink bandwidth part or an active uplink bandwidth part, and the first bandwidth and the second bandwidth overlap in a frequency domain;
    wherein the second bandwidth has one or more RB sets, the two or more RB sets in the first bandwidth and the one or more RB sets in the second bandwidth overlap in a frequency domain, wherein the indexes of the RB sets in the second bandwidth are from 0 in an ascending order in the frequency domain.

2. The method of claim 1, wherein the first bandwidth comprises a cell usable bandwidth, and the channel state of the first bandwidth comprises a listen before talk (LBT) state.

3. The method of claim 1, wherein the information is in a downlink control information (DCI), and the DCI is received in a group common physical downlink control channel (PDCCH).

4. The method of claim 1, wherein the parameter is in a radio resource control (RRC), wherein the parameter is in intraCellGuardBandDL-r16 for downlink or intraCellGuardBandUL-r16 for uplink.

5. A user equipment (UE), comprising:
    a memory;
    a transceiver; and
    a processor coupled to the memory and the transceiver;

wherein the processor is configured to control the transceiver to receive information, wherein the information is used to determine a channel state of a first bandwidth of a cell;

wherein the UE is further configured with a parameter, and the parameter is pre-defined, if the parameter is not configured;

wherein the parameter indicates one or more guard bands in the first bandwidth, and the first bandwidth comprises two or more resource block sets (RB sets), and the information has two or more bits to indicate a state of the RB sets in the first bandwidth;

wherein the bits to indicate the state of the RB sets in the first bandwidth have an ordering from a least significant bit (LSB) to a most significant bit (MSB);

wherein the RB sets in the first bandwidth have indexes, the indexes and locations of the RB sets in the first bandwidth are obtained based on the parameter and the first bandwidth;

wherein the indexes of the RB sets in the first bandwidth are from 0 in an ascending order in a frequency domain;

wherein the LSB to the MSB of the bits to indicate the state of the RB sets in the first bandwidth one-to-one correspond to index 0 to a last index in the ascending order of the RB sets in the first bandwidth, or the MSB to the LSB of the bits to indicate the state of the RB sets in the first bandwidth one-to-one correspond to the index 0 to the last index in the ascending order of the RB sets in the first bandwidth;

wherein the channel state of the first bandwidth of the cell is used to determine a channel state of a second bandwidth of the cell, wherein the second bandwidth comprises an active downlink bandwidth part or an active uplink bandwidth part, and the first bandwidth and the second bandwidth overlap in a frequency domain;

wherein the second bandwidth has one or more RB sets, the two or more RB sets in the first bandwidth and the one or more RB sets in the second bandwidth overlap in a frequency domain, wherein the indexes of the RB sets in the second bandwidth are from 0 in an ascending order in the frequency domain.

6. The UE of claim 5, wherein the first bandwidth comprises a cell usable bandwidth, and the channel state of the first bandwidth comprises a listen before talk (LBT) state.

7. The UE of claim 5, wherein the information is in a downlink control information (DCI), and the DCI is received in a group common physical downlink control channel (PDCCH).

8. The UE of claim 5, wherein the first bandwidth is provided by a radio resource control (RRC) configuration.

9. A method of communication of a base station (BS), comprising:

transmitting, by the BS, information, wherein the information is used to determine a channel state of a first bandwidth of a cell;

wherein the BS is further to transmit a parameter, and the parameter is pre-defined, if the parameter is not configured;

wherein the parameter indicates one or more guard bands in the first bandwidth, and the first bandwidth comprises two or more resource block sets (RB sets), and the information has two or more bits to indicate a state of the RB sets in the first bandwidth;

wherein the bits to indicate the state of the RB sets in the first bandwidth have an ordering from a least significant bit (LSB) to a most significant bit (MSB);

wherein the RB sets in the first bandwidth have indexes, the indexes and locations of the RB sets in the first bandwidth are obtained based on the parameter and the first bandwidth;

wherein the indexes of the RB sets in the first bandwidth are from 0 in an ascending order in a frequency domain;

wherein the LSB to the MSB of the bits to indicate the state of the RB sets in the first bandwidth one-to-one correspond to index 0 to a last index in the ascending order of the RB sets in the first bandwidth, or the MSB to the LSB of the bits to indicate the state of the RB sets in the first bandwidth one-to-one correspond to the index 0 to the last index in the ascending order of the RB sets in the first bandwidth;

wherein the channel state of the first bandwidth of the cell is used to determine a channel state of a second bandwidth of the cell, wherein the second bandwidth comprises an active downlink bandwidth part or an active uplink bandwidth part, and the first bandwidth and the second bandwidth overlap in a frequency domain;

wherein the second bandwidth has one or more RB sets, the two or more RB sets in the first bandwidth and the one or more RB sets in the second bandwidth overlap in a frequency domain, wherein the indexes of the RB sets in the second bandwidth are from 0 in an ascending order in the frequency domain.

10. The method of claim 9, wherein the first bandwidth comprises a cell usable bandwidth, and the channel state of the first bandwidth comprises a listen before talk (LBT) state.

11. The method of claim 9, wherein the information is in a downlink control information (DCI), and the DCI is transmitted in a group common physical downlink control channel (PDCCH).

12. A base station (BS), comprising:

a memory;

a transceiver; and a processor coupled to the memory and the transceiver;

wherein the processor is configured to control the transceiver to transmit information, wherein the information is used to determine a channel state of a first bandwidth of a cell;

wherein the processor is further to control transceiver to transmit a parameter, wherein the parameter is pre-defined, if the parameter is not configured;

wherein the parameter indicates one or more guard bands in the first bandwidth, and the first bandwidth comprises two or more resource block sets (RB sets), and the information has two or more bits to indicate a state of the RB sets in the first bandwidth;

wherein the bits to indicate the state of the RB sets in the first bandwidth have an ordering from a least significant bit (LSB) to a most significant bit (MSB);

wherein the RB sets in the first bandwidth have indexes, the indexes and locations of the RB sets in the first bandwidth are obtained based on the parameter and the first bandwidth;

wherein the indexes of the RB sets in the first bandwidth are from 0 in an ascending order in a frequency domain;

wherein the LSB to the MSB of the bits to indicate the state of the RB sets in the first bandwidth one-to-one correspond to index 0 to a last index in the ascending order of the RB sets in the first bandwidth, or the MSB to the LSB of the bits to indicate the state of the RB sets in the first bandwidth one-to-one correspond to the index 0 to the last index in the ascending order of the RB sets in the first bandwidth;

wherein the channel state of the first bandwidth of the cell is used to determine a channel state of a second bandwidth of the cell, wherein the second bandwidth comprises an active downlink bandwidth part or an active uplink bandwidth part, and the first bandwidth and the second bandwidth overlap in a frequency domain;

wherein the second bandwidth has one or more RB sets, the two or more RB sets in the first bandwidth and the one or more RB sets in the second bandwidth overlap in a frequency domain, wherein the indexes of the RB sets in the second bandwidth are from 0 in an ascending order in the frequency domain.

13. The BS of claim 12, wherein the first bandwidth comprises a cell usable bandwidth, and the channel state of the first bandwidth comprises a listen before talk (LBT) state.

14. The BS of claim 12, wherein the information is in a downlink control information (DCI), and the DCI is transmitted in a group common physical downlink control channel (PDCCH).

15. The BS of claim 12, wherein the first bandwidth is provided by a radio resource control (RRC) configuration.

* * * * *